July 31, 1934.  J. F. DUBY  1,968,672
VEHICLE TRAMWAY
Filed Feb. 23, 1932
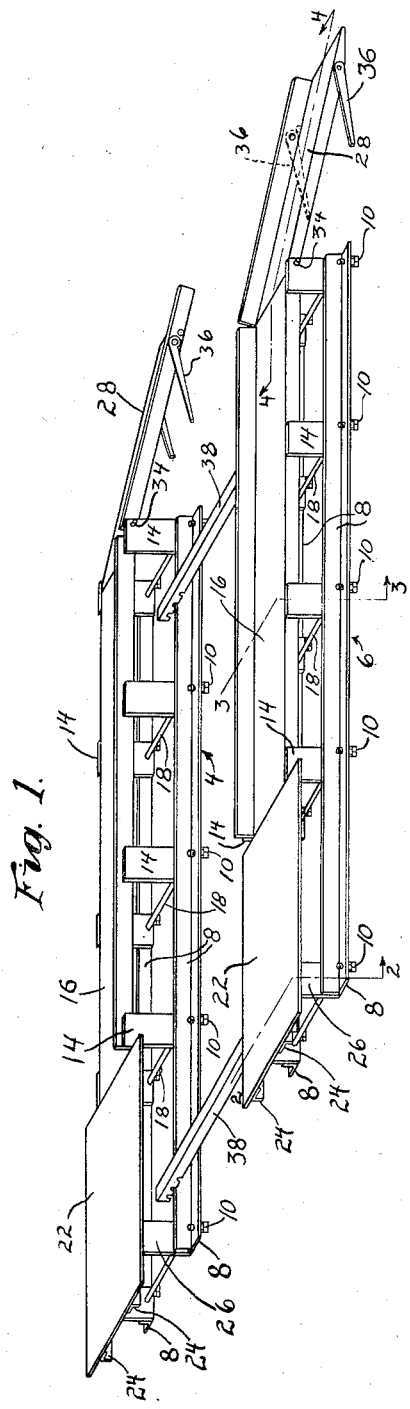
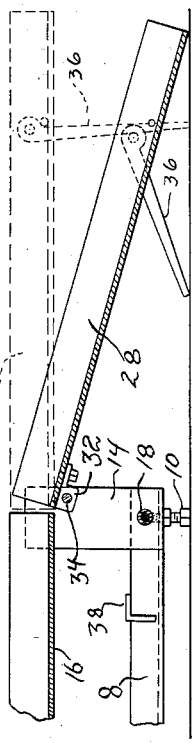
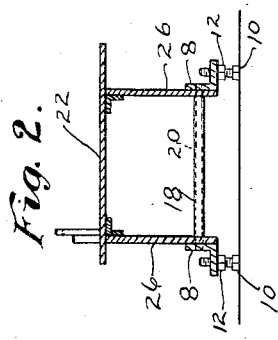
INVENTOR.
John F. Duby Patented July 31, 1934

1,968,672

UNITED STATES PATENT OFFICE 1,968,672

VEHICLE TRAMWAY

John Fabien Duby, Boston, Mass.

Application February 23, 1932, Serial No. 594,513

5 Claims. (Cl. 254—88)

My invention relates to vehicle tramways and involves numerous improvements in the construction and adaptability thereof to receive the modern automobile for the purposes of inspection, repairs and adjustments.

One of the objects of my invention is to provide a tramway which may be quickly erected on any suitable floor, not necessarily level. Another object is to provide means for quick and easy adjustment of the tracks with regard to vehicle tread dimensions and said means may later be removed to obtain a clear working space between the tracks. A further object is the adaptability of an inclined approach portion of the device to increase the working length of a track, thereby to economize on both space and material. Other objects and advantages incorporated in my improved tramway will be obvious from the following description taken in connection with the accompanying drawing and claims.

In the drawing:

Figure 1 is a general view of my device, shown in perspective.

Fig. 2 is a transverse section, on an enlarged scale, taken on line 2—2 of Fig. 1.

Fig. 3 is a similar view, but taken on line 3—3 of Fig. 1; and

Fig. 4 is a longitudinal section on line 4—4 of Fig. 1.

My tramway is composed of two individual track units 4 and 6 adapted to receive the right and left side wheels respectively of a vehicle. Each unit is identical in construction with the exception that they are made right and left.

Each unit is provided with a pair of base angle irons 8 having track adjusting, or leveling screws 10 which may carry lock nuts 12. A series of upstanding plates 14 form supports for track members 16 having upstanding wheel guiding portions as shown. The plates 14 may be attached to their respective angle irons and tracks by welding or any suitable method. The unit may be strengthened at the base irons by means of spacing tubes 18 and long bolts 20 the latter of which extend through the vertical flange of angle irons 8 and may be welded thereto or fastened in any suitable manner.

Adjacent the forward ends of tracks 16 are substantially wide table members or instrument plates 22 onto which the front wheels of a vehicle may be driven for inspection and the width of said tables being sufficient to permit their use as a gage or testing instrument support. These tables are preferably flush with the tracking surfaces of members 16 constituting extensions thereof and the length of the two members combined is slightly greater than the wheel base dimension of cars to be accommodated.

I prefer to support these tables upon angle irons 24 which may be attached at their inner ends to the forward set of upright plates 14 and supported near their outer ends by shorter plates 26, which in turn are attached to base irons 8 by welding, as referred to above. It is desirable to position the leveling screws 10 directly beneath each of the upstanding plates referred to and also to locate the spacing tubes 18 intermediate a pair of opposite plates, as shown.

At the rear, or approach end of the tramway, I provide inclined track members 28, which may be similar to track 16, in cross section. At the inner ends of members 28 I provide bearing blocks 32 suitably attached thereto and adapted to receive pivot shafts 34 which in turn may be received by plates 14. Subsequently to driving a vehicle onto tracks 16 the inclined members 28 may be raised to a horizontal position, as indicated by dotted lines in Fig. 4, whereupon said members will serve as an extension to track 16 which will permit greater movement of the vehicle, longitudinally of the tramway, for testing purposes. Any convenient form of support, such as folding legs 36, may be utilized to maintain this horizontal position of member 28, or a removable block may be used if desired. It will be clear that this feature affords a great saving of space and material.

I provide a pair of angle irons 38, having notches in one of their flanges, to properly space the units 4 and 6 with respect to vehicle tread. These members may be adapted to slide along the base members to any convenient position or may be removed after which there will be no obstructions whatever between the units to interfere with a workman's operations beneath the vehicle and the units will retain their positions due to the weight thereof.

It is to be understood that the forms of my invention herein shown and described are to be taken as preferred embodiments thereof and that the scope of the invention is more clearly defined by the accompanying claims.

I claim:

1. A vehicle tramway comprising base members, vehicle wheel tracks supported by said base members, inclined track members forming an approach to the first mentioned tracks and adapted for use as an extension thereof, an instrument table located at the forward end of each first mentioned track, means for bringing the first mentioned tracks into a common level plane, and means for indicating parallelism and desirable spacing of tracks adapted to engage with said base members and being slidable lengthwise thereof.

2. A vehicle tramway comprising a right and left hand track unit respectively having no fixed connections therebetween, each of said track units having a comparatively wide instrument table at its forward end, said table being flush with the track surface and projecting laterally outward therefrom, and means associated with the track units for indicating parallelism and desirable spacing of tracks.

3. A vehicle tramway comprising a pair of vehicle wheel tracks, an individual instrument table attached to its respective track, means to facilitate the bringing of the tracks into parallel relationship and desirable spacing, said means being adapted to act as an automatic stop as tracks are moved into said desirable spacing.

4. A vehicle tramway comprising a pair of vehicle wheel tracks, means whereby each track and its associated parts may be brought to a level position both longitudinally and laterally thereof, said means being individually operable with respect to each track, and means associated with the track units for indicating parallelism and desirable spacing of tracks.

5. A vehicle tramway comprising a right and a left hand track unit respectively free from fixed interconnections, an individual base portion for each of said units composed of elongated angle-irons, and track spacing means associated with said angle-irons, said means being slidable lengthwise of the angle-irons, whereby the track units may be brought into parallel relationship and spaced a predetermined distance apart.

JOHN FABIEN DUBY.